United States Patent [19]

Kawasumi et al.

[11] Patent Number: 4,810,734
[45] Date of Patent: Mar. 7, 1989

[54] PROCESS FOR PRODUCING COMPOSITE MATERIAL

[75] Inventors: Masaya Kawasumi; Masao Kohzaki; Yoshitsugu Kojima; Akane Okada; Osami Kamigaito, all of Aichi, Japan

[73] Assignee: Kabushiki Kaisha Toyota Chuo Kenkyusho, Aichi, Japan

[21] Appl. No.: 168,392

[22] Filed: Mar. 15, 1988

[30] Foreign Application Priority Data

Mar. 26, 1987 [JP] Japan .................. 62-72568
Dec. 15, 1987 [JP] Japan .................. 62-316482

[51] Int. Cl.$^4$ .............................................. C08K 3/34
[52] U.S. Cl. ....................................... 523/216; 523/461; 523/508; 524/714; 524/718; 524/789; 524/791
[58] Field of Search ................ 523/216, 461, 508; 524/718, 714, 724, 789, 791

[56] References Cited

U.S. PATENT DOCUMENTS

| 3,372,137 | 3/1968 | Tierney | 524/789 |
|---|---|---|---|
| 3,883,469 | 5/1975 | Brassat | 524/789 |
| 4,081,496 | 3/1978 | Finlayson | 523/508 |
| 4,216,135 | 8/1980 | Finlayson | 523/508 |
| 4,240,951 | 12/1980 | Moll et al. | 523/508 |
| 4,365,030 | 12/1982 | Oswald et al. | 523/508 |
| 4,412,018 | 10/1983 | Finlayson et al. | 523/508 |
| 4,473,675 | 9/1984 | Knudson et al. | 523/508 |
| 4,676,929 | 6/1987 | Rittler | 252/315.2 |
| 4,677,158 | 6/1987 | Tso et al. | 524/789 |
| 4,695,402 | 9/1987 | Finlayson et al. | 523/508 |

FOREIGN PATENT DOCUMENTS 58-35211 8/1983 Japan .

Primary Examiner—Lewis T. Jacobs
Attorney, Agent, or Firm—Oblon, Fisher, Spivak, McClelland & Maier

[57] ABSTRACT

Provided herein is a process for producing a composite material composed of a polymer and the layered silicate constituting the clay mineral being connected to the polymer through ionic bonding. The process comprises contacting a layered clay mineral with a swelling agent in the presence of a dispersion medium, thereby forming a complex, mixing said complex containing said dispersion medium with a monomer, and polymerizing said monomer contained in said mixture. The process permits the economical and efficient production of a composite material in which the layered silicate is uniformly dispersed.

6 Claims, No Drawings

PROCESS FOR PRODUCING COMPOSITE MATERIAL

BACKGROUND OF THE INVENTION

1. Field of the Invention

The present invention relates to a process for producing a composite material having high mechanical strength and heat resistance. More particularly, it relates to a process for producing economically and efficiently a composite material composed of a polymer such as polyamide and a layered silicate constituting a clay mineral which are bonded to each other through ionic bonding and are uniformly mixed with each other.

2. Description of the Related Art

Various attempts have been made so far to incorporate an organic polymeric material with an inorganic material such as calcium carbonate, clay mineral, and mica for the improvement of its mechanical properties. One of such attempts has lead the present inventors to findings that the polymerization of polyamide monomer in the presence of a clay mineral forms a composite material having good mechanical strength and heat resistance through intimate mixing at the molecular level of the polyamide and the layered silicate constituting the clay mineral. (See Japanese Patent Laid-open No. 74957/1987 (which corresponds to U.S. application No. 909,472, U.S. Pat. No. 4,739,007, issued Apr. 19, 1988).

This composite material is produced by three steps of contacting, mixing, and polymerization which are explained in the following. In the contacting step, a clay mineral is brought into contact with a swelling agent in a dispersion medium such as water. In this step there is obtained a complex containing the dispersion medium which is swollen by the polyamide monomer at a temperature higher than the melting point of the monomer. Subsequently, this complex is dried to remove the dispersion medium and then pulverized using a mortar or the like. The dried and pulverized complex is mixed with a polyamide monomer in the mixing step. The resulting mixture is heated to polymerize the polyamide monomer in the mixture in the polymerization step. In this way there is obtained a composite material composed of a polyamide resin and layered silicate dispersed therein.

A disadvantage of the above-mentioned process is that the contacting step requires large-scale equipment and a great deal of energy and time for drying and pulverizing. This leads to a high production cost and a low productivity. Another disadvantage is that the complex is not uniformly mixed with the polyamide monomer in the mixing step because the resulting mixture lacks flowability. This gives rise to the lack of homogeneity in the composite material which is eventually obtained.

SUMMARY OF THE INVENTION

In order to eliminate the above-mentioned disadvantages, the present inventors carried out a series of researches, which led to the present invention.

The first object of the present invention is to provide a process for producing a composite material economically and efficiently with a minimum of equipment, energy, and time.

The second object of the present invention is to provide a process for producing a composite material composed of a polymer such as polyamide and a layered silicate more uniformly dispersed therein.

The process of the present invention for producing a composite material comprises a contacting step of contacting a layered clay mineral having a cation exchange capacity of 50 to 200 milliequivalents per 100 g with a swelling agent in the presence of a dispersion medium, thereby forming a complex which has the property of being swollen by a molten monomer of a polymer or by a mixture of said monomer and dispersion medium, a mixing step of mixing said complex containing said dispersion medium with a monomer, and a polymerization step of polymerizing said monomer contained in said mixture.

According to the process of the present invention, a complex containing the dispersion medium is prepared in the contacting step and it is transferred as such to the subsequent mixing step. This obviates the steps of drying and pulverizing the complex and hence leads to economy and efficiency.

According to the process of the present invention, the complex containing the dispersion medium is mixed with a monomer in the mixing step. In this step the components are uniformly mixed with ease because it is possible to increase or impart fluidity. This permits the layered silicate to be uniformly dispersed in the intended composite material. This also provides the composite material with a ploymer having a narrow molecular weight distribution, which in turn provides the composite material with improved mechanical strength, elastic modulus, and heat resistance.

The above and other objects, features, and advantages of the present invention will become more apparent from the following description in which a preferred embodiment of the invention is shown by way of illustrative example.

DETAILED DESCRIPTION OF THE INVENTION

The constitution of the present invention will be explained more fully in the following.

In the first step (contacting step), a layered clay mineral having a cation exchange capacity of 50 to 200 milliequivalents per 100 g is brought into contact with a swelling agent in the presence of a dispersion medium. This step causes the clay mineral to absorb the swelling agent, forming a complex with swells upon contact with a molten monomer of a polymer or with a mixture of said monomer and dispersion medium.

The contacting is accomplished by immersing a clay mineral in a dispersion medium containing a swelling agent and subsequently washing the clay mineral to remove excess ions; or by contacting a clay mineral suspended in a dispersion medium with a cation exchange resin which has previously been treated with a swelling agent, thereby effecting the ion exchange.

The clay mineral is any natural or synthetic one which has a cation exchange capacity of 50 to 200 milliequivalents per 100 g and also a large area for contact with the monomer. Examples of the clay mineral include smectite clay minerals (such as montmorillonite, saponite, beidellite, nontronite, hectorite, and stevensite); and vermiculite and halloysite.

The clay mineral is composed of layered silicate, and this layered silicate imparts good mechanical properties and heat resistance to the polymer material. The layered silicate is layered phyllosilicate composed of magnesium silicate layers or aluminum silicate layers, each layer being 7–12 Å thick. These layered silicates are negatively charged on account of the iomorphous ion exchange. They differ from one another in characteristic properties depending on the density and distribution of negative charge. The preferred density of negative charge is such that one negative charge occupies an area of 25–200 Å$^2$ on the layer surface.

The clay mineral is required to have a cation exchange capacity of 50 to 200 milliequivalents per 100 g. With a capacity greater than the upper limit, the clay mineral does not finely disperse at the molecular level on account of the high layer-to-layer bond strength. With a capacity smaller than the lower limit, the clay mineral does not adsorb the swelling agent sufficiently and hence does not provide the desired complex.

Incidentally, the clay mineral should preferably be ground beforehand into particles of desired shape and size by means of a mixer, ball mill, vibration mill, pin mill, jet mill, pulverizer, or the like.

The swelling agent expands the interlayer distance of the clay mineral, thereby permitting the clay mineral to take monomers into the interlayer space. It is a compound having an onium ion and a functional ion capable of reacting and bonding with a polymer compound. Examples of the onium ion include ammonium ion (—N$_3$+), trimethylammonium ion (—N+(CH$_3$)$_3$), trimethyl phosphonium ion (P+(CH$_3$)$_3$), and dimethyl sulfonium ion (S+(CH$_3$)$_2$). Examples of the functional group include a vinyl group, carboxyl group hydroxyl group, epoxy group, and amino group. The swelling agents may be along or in combination with one another.

In the case where the polymer compound is polyamide, the preferred swelling agent is one which forms an onium ion (X+—R—COOH) having a carboxyl group, where X+ is an onium ion such as ammonium ion (—NH$_3$+) and R is an alkylene group which contains an alkylene chain represented by (CH$_2$)$_n$ and may also contain in the alkylene chain a linkage of phenylene group

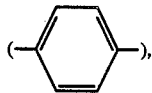

branch

or vinylene group (—HC=CH—).

Examples of the swelling agent include those compounds having a 4-amino-n-butyric acid ion (NH$_3$+C$_3$H$_6$COOH), 6-amino-n-caproic acid ion (NH$_3$+C$_5$H$_{10}$COOH), ω-aminocaprylic acid ion (NH$_3$+C$_7$H$_{14}$COOH), 10-aminodecanoic acid ion (NH$_3$+C$_9$H$_{18}$COOH), 12-aminododecanoic acid ion (NH$_3$+C$_{11}$H$_{22}$COOH), 14-aminotetradecanoic acid ion (NH$_3$+C$_{13}$H$_{26}$COOH), 16-aminohexadecanoic acid ion (NH$_3$+C$_{15}$H$_{30}$COOH), and 18-aminooctadecanoic acid ion (NH$_3$+C$_{17}$H$_{34}$COOH). They may be used alone or in combination with one another.

In the case where the polymer compound is a vinyl polymer, the swelling agent is selected from those compounds which have methacryloyloxyethyltrimethylammonium chloride (CH$_2$=C(CH$_3$)COOCH$_2$CH$_2$N+(CH$_3$)$_3$−Cl−) or 4-vinylpyridinium chloride

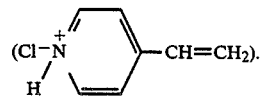

They are used alone or in combination with one another.

The dispersion medium disperses the layered silicate in the dispersion medium, thereby allowing the layered silicate to easily come into contact with the swelling agent. The kind of the dispersion medium differs depending on the clay mineral, swelling agent, and monomer to be used. The preferred dispersion medium is one which disperses the clay mineral uniformly and exhibits good miscibility with the swelling agent and monomer.

Examples of the dispersion medium include water, methanol, ethanol, propanol, isopropanol, ethylene glycol, 1,4-butanediol, glycerin, dimethyl sulfoxide, N,N-dimethylformamide, acetic acid, formic acid, pyridine, aniline, phenol, nitrobenzene, acetonitrile, acetone, methyl ethyl ketone, chloroform, carbon disulfide, propylene carbonate, 2-methoxyethanol, ether, carbon tetrachloride, and n-hexane. They are used alone or in combination with one another. One or more than one kind of dispersion medium should preferably be selected from water, methanol, and ethanol in the case where the clay mineral is montmorillonite and the polymer is polyamide.

The complex obtained in the contacting step has the property of being swollen by a molten monomer or a mixture of said monomer and dispersion medium. Swelling is effected when the molten monomer or the mixture of the monomer and dispersion medium infiltrates into the interlayer space and expands it. The driving force of swelling is derived from the affinity of the onium ion in the complex to the molten monomer or the mixture of the monomer and dispersion medium.

The complex obtained in the contacting step contains the dispersion medium. It may be used as such in the subsequent mixing step; but it may also be used after the dispersion medium has been partially removed by vacuum filtration, centrifugal separation, or decantation. In the latter case, the dispersion medium is removed such that it remains unremoved in the complex in an amount of 100 to 3000 parts by weight for 100 parts by weight of the complex. With an amount less than 100 parts by weight, the complex is not uniformly mixed with the monomer. Conversely, with an amount in excess of 3000 parts by weight, it takes a long time to distill away the dispersion medium from the composite material in the polymerization step.

In the second step (mixing step), the complex obtained in the above-mentioned contacting step which contains the dispersion medium is mixed with a monomer. The monomer is a compound which, upon polymerization, constitutes a polymer which is a basic component of the composite material.

Examples of the polymer include polyamide resins, vinyl polymers, thermosetting resins, polyester resins, polyimide resins, polyphenylene sulfide, polyacetal, polyphenylene oxide, polycarbonate, polysulfone, polyether sulfone, fluoroethylene resins, rubber, and other polymers of any kind. They may be used alone or in combination with one another.

Examples of the monomer of polyamide resins include amino acids such as 6-amino-n-caproic acid and 12-aminododecanoic acid; nylon salts such as adipic acid salt of hexamethylenediamine; and lactams of caprolactam, butyrolactam, capryllactam, and dodecanolactam.

Examples of the monomer of vinyl polymers include ethylene, propylene, butadiene, vinyl chloride, vinylidene chloride, styrene, acrylic acid, methacrylic acid, t-butylacrylamide, acrylonitrile, norbornadiene, N-vinylcarbazole, vinylpyridine, N-vinyl-2-pyrrolidone, 1-butene, isobutene, vinylidene cyanide, 4-methylpentene-1, vinyl acetate, vinylisobutyl ether, methyl vinyl ketone, phenyl vinyl ketone, phenyl vinyl sulfide, and acrolein.

Examples of the monomer of thermosetting resins include those of phenolic resin, epoxy resin, unsaturated polyester resin, alkyd resin, furan resin, urea resin, melamine resin, polyurethane resin, and aniline resin.

Examples of the monomer of fluoroethylene resin include tetrafluoroethylene and chlorotrifluoroethylene.

In the mixing step, the mixing of the complex containing the dispersion medium with the monomer of a polymer is accomplished by mechanical means such as mixer.

The mixture obtained in the mixing step may be used as such in the subsequent polymerization step or it may be used after the dispersion medium in the mixture has been distilled away. The distillation of the dispersion midium, may be accomplished by heating the mixture in a nitrogen stream. The heating temperature is 120° to 220° C. in the case where the dispersion medium is water.

In the third step (polymerization step), the monomer contained in the mixture obtained in the previous mixing step is polymerized to yield the desired composite material. Polymerization in this step is carried out in various manners depending on the type of monomer selected. In addition, this step permits the use of various catalysts and accelerators for polymerization.

Incidentally, the content of the dispersion medium in each step may be determined from the amount of the dispersion medium added in the contacting step and the amount of the dispersion medium distilled away in each step. It may also be directly determined by analyzing a small portion of the reaction product by IR or the like.

The composite material prepared as mentioned above is composed of a polymer and a layered silicate uniformly dispersed in the polymer. The layered silicate has a layer thickness of 7 to 12 Å and a layer-to-layer distance greater than 30 Å. In addition, the layered silicate is partly connected to the polymer chain through ionic bonding.

The content of the silicate in the polymer should preferably be 0.05 to 150 parts by weight for 100 parts by weight of the polymer. With a content less than 0.05 parts by weight, the silicate does not produce the desired reinforcing effect. With a content more than 150 parts by weight, the resulting composite material is merely an unmoldable powder of interlayer compound because of the insufficient polymer component.

The composite material of the present invention has such a structure that the layered silicate constituting the negatively charged clay mineral is connected through ionic bonding to the onium ions such as ammonium ion ($NH_3^+$) and trimethylammonium ion ($-N^+(CH_3)_3$) derived from the swelling agent and the resulting group is connected through covalent bonding to the main chain or side chain of the polymer.

The composite material obtained by the process of the present invention may be made directly into molded products by injection molding or compression molding. Alternatively, it is also possible to obtain molded products by performing the above-mentioned polymerization reaction in a mold.

The invention will be more clearly understood with reference to the following examples.

EXAMPLE 1

At first, a water-containing complex was prepared in the following manner. One hundred grams of montmorillonite from Yamagata Prefecture, Japan (having a cation exchange capacity of 119 milliequivalents per 100 g and an area of 106 Å$^2$ per negative charge) was dispersed in 1.75 liters of water. To the dispersion were added 51.2 g of 12-aminododecanoic acid and 6 ml of conc. hydrochloric acid, followed by mixing at 80° C. for 60 minutes. After thorough washing with water, the water-containing complex was collected by filtration under reduced pressure using a Büchner funnel. The thus obtained complex was found to contain water as indicated in Table 1.

The water-containing complex in an amount as indicated in Table 1 was reacted with 100 g of $\epsilon$-caprolactam in an autoclave equipped with a stirrer. The reactants were heated up to 180° C. while stirring under a nitrogen stream to distill away water. The autoclave was closed when the water content was reduced to 0.5 parts by weight for 100 parts by weight of the monomer. The reactants were heated at 250° C. for 2 hours. The reactants were further heated under a nitrogen stream at 250° C. for 3 to 12 hours. Thus there were obtained four kinds of composite materials (designated as Nos. 1 to 4).

For the purpose of comparison, three kinds of composite materials (designated as Nos. C1 to C3) were prepared in the following manner. The water-contaning complex prepared as mentioned above was freeze-dried at room temperature for 48 hours and then crushed using a mortar. The crushed complex in an amount as indicated in Table 1 was reacted with 100 g of $\epsilon$-caprolactam and 0.5 g of water at 250° C. for 2 hours in the same autoclave (closed) as mentioned above. The reactants were further heated under a nitrogen stream at 250° C. for 3 to 5 hours to complete polymerization of $\epsilon$-caprolactam.

Each of the above-mentioned seven kinds of composite materials was crushed using a hammer mill, followed by washing with hot water and vacuum drying. The polyamide in the composite material was examined by GPC method for number-average molecular weight ($M_n$) and molecular weight distribution ($M_w/M_n$, where $M_w$ denotes a weight-average molecular weight). Also, the interlayer distance of the silicate was measured by the powder method of X-ray diffraction. Incidentally, the interlayer distance is 16 Å in the case of complex composed of 12-aminododecanoic acid and montmorillonite.

The average time required for the entire process (from the contacting step to the polymerization step) is shown in Table 1. Further, the composite materials Nos, 1, 2, 3, C1, C2, and C3 were molded into test pieces, which underwent tensile test and heat-distortion test according to ASTM. The results are shown in Table 2.

TABLE 1

| Sample No. | Polymerization conditions | | | | Yield of composite material (%) | $M_n$ (×10⁴) | $M_w/M_n$ | Interlayer distance of silicate (Å) | Time for entire process (h) |
|---|---|---|---|---|---|---|---|---|---|
| | Monomer ε-capro-lactam* | Water-containing complex | | Polymerization time(h) | | | | | |
| | | Complex* | Water* | | | | | | |
| 1 | 100 | 2.0 | 18.0 | 5 | >90 | 3.3 | 5.0 | >100 | 11 |
| 2 | 100 | 5.3 | 47.7 | 6 | >90 | 2.5 | 4.8 | >100 | 12 |
| 3 | 100 | 8.7 | 78.3 | 7 | >90 | 2.4 | 5.3 | >100 | 13 |
| 4 | 100 | 5.3 | 265 | 6 | >90 | 2.4 | 4.9 | >100 | 20 |
| C1 | 100 | 2.0 | 0 | 5 | >90 | 3.2 | 5.6 | >100** | 64 |
| C2 | 100 | 5.3 | 0 | 6 | >90 | 2.3 | 5.2 | >100** | 65 |
| C3 | 100 | 8.7 | 0 | 7 | >90 | 1.8 | 6.0 | >100** | 66 |

*Quantities in parts by weight
**partly <30

TABLE 2

| Sample No. | Tensile test | | | Heat test Heat distortion point (°C.) |
|---|---|---|---|---|
| | Strength (× 10⁷ N/mm²) | Elongation (%) | Modulus (× 10⁷ N/mm²) | |
| 1 | 7.9 | 25 | 263 | 125 |
| 2 | 8.3 | 5.2 | 290 | 145 |
| 3 | 8.4 | 4.1 | 322 | 157 |
| C1 | 7.5 | 20 | 255 | 115 |
| C2 | 8.0 | 5.0 | 282 | 132 |
| C3 | 8.2 | 3.9 | 307 | 153 |

The composite materials obtained in the comparative examples contain polyamide having a broad molecular weight distribution and a low number-average molecular weight on account of the heterogeneous reaction system. By contrast, the composite materials obtained in the working examples contain polyamide having a comparatively narrow molecular weight distribution and a high number-average molecular weight on account of the homogeneous reaction system.

In the composite materials obtained in the comparative examples, the silicate is ununiformly dispersed, with the interlayer thereof being partly smaller than 30 Å. By contrast, in the composite materials obtained in the working examples, the silicate is uniformly dispersed at the molecular level. The time required for the entire process in the working examples was one-fifth to one-sixth of that in the comparative examples. Furthermore, it is noted from Table 2 that the composite materials in the working examples are superior in strength, modulus, and heat resistance to those in the comparative example.

EXAMPLE 2

At first, a complex containing a dispersion medium was prepared in the same manner as in Example 1, except that synthetic saponite (having a cation exchange capacity of 100 milliequivalents per 100 g and an area of 126 Å², per negative charge) was used as the clay mineral and ethanol was used as the dispersion medium. The thus obtained complex was found to contain ethanol (dispersion medium) as indicated in Table 3.

The thus obtained complex containing the dispersion medium was made into a composite material (sample No. 5) in the same manner as in Example 1 except that 50 parts by weight of the complex containing the dispersion medium was reacted with 100 parts by weight of ε-caprolactam.

For the purpose of comparison, a composite material (sample No. C4) was prepared in the same manner as above, except that the complex containing the dispersion medium was vacuum-dried at 120° C. for 24 hours prior to use.

The resulting composite material was examined by X-ray diffractometry. Sample No. 5 gave no peak (d(001)=18.5 Å) attributable to the (001) plane of saponite. This indicates that the saponite layers are uniformly dispersed at the molecular level. By contrast, sample No. C4 gave a peak attributable to the (001) plane of saponite. This indicates the existence of some layers (the layer distance being smaller than 30 Å) which are not fully expanded.

The samples were examined for silicate interlayer distance, tensile modulus, and heat distortion temperature in the same manner as in Example 1. The results are shown in Table 3 along with the time required for the entire process.

TABLE 3

| Sample No. | Complex (parts by wt.) | Ethanol (parts by wt.) | Interlayer distance of silicate (Å) | Modulus (N/mm²) | Heat distortion point (°C.) | Time for process (h) |
|---|---|---|---|---|---|---|
| 5 | 5 | 45 | >100 | 2.60 × 10⁹ | 123 | 14 |
| C4 | 5 | 0 | >100* | 2.35 × 10⁹ | 110 | 38 |

*partly <30

It is noted from Table 3 that the composite material in the working example is superior to that in the comparative example in modulus and heat resistance. In addition, the time for the entire process in the working example is less than a half of that in the comparative example.

EXAMPLE 3

At first, a complex containing a dispersion medium was prepared in the same manner as in Example 1, except that an ammonium salt having a terminal vinyl group as represented by the formula below

was used as the swelling agent, and a 1:1 (by volume) mixture of water and N,N-dimethylformamide (DMF) was used as the dispersion medium. The thus obtained complex was found to contain 95 parts by weight of the dispersion medium for 5 parts by weight of the complex.

One hundred parts by weight of the complex containing the dispersion medium was mixed with 100 parts by weight of methyl methacrylate (MMA) as the monomer of vinyl polymer, and 0.5 parts by weight of potassium persulfate as the radical polymerization initiator. A white uniform mixture was obtained. The mixture was heated at 60° C. for 5 hours with stirring. A viscous liquid was obtained. After removal of the dispersion medium, the viscous liquid was added dropwise to methanol for the reprecipitation of polymethyl methacrylate. Thus there was obtained a composite material (sample No. 6).

The thus obtained composite material was found to be composed of polymethyl methacrylate and 5.7% of montmorillonite according to IR, NMR, and elemental analysis. The X ray diffractometry of this composite material gave no peak attributable to the (001) plane of montmorillonite. This indicates that individual layers of montmorillonite are uniformly dispersed in the polymer.

The polymer was found to have a number-average molecular weight ($M_n$) of $9.15 \times 10^4$ and a weight-average molecular weight ($M_w$) of $3.80 \times 10^5$ according to gel permeation chromatography (GPC). The composite material was found to have a melt viscosity of 2300 Pa·s (220° C., shear rate=370 $s^{-1}$). The composite material was capable of injection molding, and the molded product retained its shape in the temperature range from the glass transition point (Tg) to 250° C.

For the purpose of comparison, a composite material (sample No. C5) was prepared in the same manner as above, except that the complex containing the dispersion medium was vacuum-dried at 120° C. for 48 hours after washing and the dried complex was crushed prior to use. The dried complex was not swollen by MMA but precipitated. Upon polymerization with stirring, the mixture gave a heterogeneous solid. The examination by X-ray diffractometry revealed that the composite material has the peak attributable to the (001) plane at $2\theta = 6.2°$ (corresponding to d =16.5 Å). This indicates that the layers of the montmorillonite were expanded very little. Upon molding, the composite material gave a molded product which readily deforms at a temperature above the glass transition point.

Also for the purpose of comparison, a composite material (sample No. C6) was prepared in the same manner as above except that 5 parts by weight of the complex which had been vacuum-dried and crushed was added to 95 parts by weight of a 1:1 mixture (by volume) of water and DMF. The complex was swollen by the water-DMF mixture and monomer and underwent uniform polymerization reaction.

In X-ray diffractometry, the composite material gave no peak attributable to the (001) plane of montmorillonite. This indicates that the montmorillonite layers are uniformly dispersed.

The three samples of composite materials were examined for silicate interlayer distance and tensile modulus in the same manner as in Example 1. The results are shown in Table 4 along with the time required for the entire process.

TABLE 4

| Sample No. | Interlayer distance of silicate (Å) | Tensile modulus (GPa) | Time for entire process (h) |
|---|---|---|---|
| 6 | >100 | 5.68 | 12 |
| C5 | 21 | 3.20 | 62 |
| C6 | >100* | 5.01 | 62 |

*partly <30

It is noted from Table 4 that the composite material in the working example is superior in those in the comparative examples in modulus. In addition, the time for the entire process in the working example is about one-fifth of that in the comparative example.

EXAMPLE 4

At first, a water-containing complex was prepared in the following manner. One hundred grams of vermiculite (having a cation exchange capacity of 140 milliequivalents per 100 g and an area of 90.1 $Å^2$ per negative charge) as a clay mineral was dispersed in 1.75 liters of water. To the dispersion were added 51.2 g of 12-aminododecanoic acid and 6 ml of conc. hydrochloric acid, followed by mixing at 80° C. for 24 hours. After thorough washing with water, the water-containing complex was collected by filtration under reduced pressure using a Büchner funnel. The thus obtained complex was found to contain 80 parts by weight of water for 20 parts by weight of the complex without water.

25 parts by weight of this water-containing complex was mixed with 70 parts by weight of epichlorohydrin and 30 parts by weight of bisphenol-A, which are both monomers of thermosetting resin, and 30 parts by weight of 40% aqueous solution of NaOH, followed by stirring at 120° C. for 3 hours.

In X-ray diffractometry, the resulting composite material (sample No. 7) gave no peak attributable to the (001) plane of vermiculite. This indicates that the vermiculite layers are uniformly dispersed.

For the purpose of comparison, a composite material (sample No. C7) was prepared in the same manner as above except that the water-containing complex was mixed with the monomer of thermosetting resin after vacuum drying. In the X-ray diffractometry, this composite material gave a small peak attributable to the (001) plane of vermiculite. This indicates the presence of vermiculite layers (the layer distance being smaller than 30 Å) which are not fully expanded.

Each of the above-mentioned two composite materials was mixed with 30 parts by weight of diaminodiphenylsulfone and the mixture was compression-molded at 200° C. The molded products were examined for silicate interlayer distance, heat distortion temperature, and Izod impact resistance. The results are shown in Table 5 along with the time required for the entire process.

TABLE 5

| Sample No. | Interlayer distance of silicate (Å) | Heat distortion point (°C.) | Izod impact strength (J/m) | Time for process (h) |
|---|---|---|---|---|
| 7 | >100 | 208 | 1.08 | 36 |
| C7 | >100* | 189 | 0.32 | 90 |

*partly <30

It is noted from Table 5 that the composite material in the working example is superior to that in the comparative example in heat resistance and impact resistance. In addition, the time for the entire process in the working example is shorter than that in the comparative example.

What is claimed is:

1. A process for producing a composite material which comprises a contacting step of contacting a layered clay mineral having a cation exchange capacity of 50 to 200 milliequivalents per 100 g with a swelling agent in the presence of a dispersion medium, thereby forming a complex which has the property of being swollen by a molten monomer of a polymer or by a mixture of said monomer and dispersion medium, a mixing step of mixing said complex containing said dispersion medium with said monomer of a polymer, and a polymerization step of polymerizing said monomer in said mixture.

2. A process for producing a composite material as claimed in claim 1, wherein the layered clay mineral is at least one kind selected from smectite clay mineral, vermiculite, and halloysite.

3. A process for producing a composite material as claimed in claim 1, wherein the swelling agent is one which has both an onium ion, and a functional group capable of reacting with a polymer.

4. A process for producing a composite material as claimed in claim 1, wherein the complex obtained in the contacting step is subjected to a step to partly remove the dispersion medium prior to the mixing step.

5. A process for producing a composite material as claimed in claim 1, wherein the complex to be mixed with the monomer of a polymer in the mixing step is one which contains 100 to 3000 parts by weight of dispersion medium per 100 parts by weight thereof.

6. A process for producing a composite material as claimed in claim 1, wherein the polymer is at least one member selected from polyamide resins, vinyl polymers, thermosetting resins, polyester resins, polyimide resins, polyphenylene sulfide, polyacetal, polyphenylene oxide, polycarbonate, polysulfone, polyethersulfone, fluoroethylene resins, and rubber.

* * * * *

UNITED STATES PATENT AND TRADEMARK OFFICE
CERTIFICATE OF CORRECTION

PATENT NO. : 4,810,734

DATED : Mar. 7, 1989

INVENTOR(S) : Jeffrey R. Hyde

It is certified that error appears in the above-identified patent and that said Letters Patent is hereby corrected as shown below:

Column 10, Claim 1, line 5, formula should read:

$$--(CR_2-CR_2-S_2-CR_2-CR_2-O-CH_2-O)_n--$$

Signed and Sealed this

Twentieth Day of August, 1991

Attest:

HARRY F. MANBECK, JR.

Attesting Officer     Commissioner of Patents and Trademarks